(12) United States Patent
Van Antwerpen et al.

(10) Patent No.: US 7,246,340 B1
(45) Date of Patent: Jul. 17, 2007

(54) TIMING-DRIVEN SYNTHESIS WITH AREA TRADE-OFF

(75) Inventors: Babette Van Antwerpen, Mountain View, CA (US); Jinyon Yuan, Cupertino, CA (US)

(73) Assignee: Altera Corporation, San Jose, CA (US)

(*) Notice: Subject to any disclaimer, the term of this patent is extended or adjusted under 35 U.S.C. 154(b) by 88 days.

(21) Appl. No.: 10/849,534

(22) Filed: May 18, 2004

(51) Int. Cl.
*G06F 17/50* (2006.01)

(52) U.S. Cl. .................. 716/18; 716/1; 716/2

(58) Field of Classification Search .......... 716/18, 716/1, 2, 17, 16
See application file for complete search history.

(56) References Cited

OTHER PUBLICATIONS

Vuillod et al., "Generalized Matching from Theory to Application", Nov. 1997, IEEE/ACM International Conference on Computer-Aided Design, Digest of Technical Papers., pp. 13-21.*
Benini et al., "Iterative Remapping for Logic Circuits", Oct. 1998, IEEE Teansactions on Computer-Aided Design of Integrated Circuits and Systems, vol. 17, iss. 10, pp. 948-964.*
Brayton, Robert K. et al.; "MIS: A Multiple-Level Logic Optimization System"; 1987, *IEEE Transactions on Computer-Aided Design*; vol. CAD-6, No. 6, pp. 1062-1081.
Cong, Jason et al.; "Simultaneous Depth and Area Minimization in LUT-based FPGA Mapping"; 1995, *Proceedings of the ACM/SIGDA International Symposium on FPGAs*, Monterey, California, pp. 68-74.
Sentovich, Ellen M.. et al.; "SIS: A System for Sequential Circuit Synthesis"; 1992, *Electronic Research Laboratorium Memorandum No. UCB/ERL M92/41*, pp. 1-45.
van Antwerpen et al.; "Register Retiming Technique"; U.S. Appl. No. 10/446,650, filed May 27, 2003.

* cited by examiner

*Primary Examiner*—Sun James Lin
(74) *Attorney, Agent, or Firm*—Townsend and Townsend and Crew LLP

(57) ABSTRACT

An embodiment of the invention is a logic minimization method that provides improved user design performance without a substantial increase in user design area. Alternate factorizations are determined for portions of the user design. For each factorization, a delay metric is computed. The user design is optimized by selecting factorizations based on a balance of performance and area considerations. The optimized design is then mapped to the hardware architecture of the programmable device. A first portion of the user design is mapped to maximize performance, while a second portion of the user design is mapped to minimize area. The first portion of the user design includes a set of data paths each having a delay metric above a delay threshold. The delay metric can be derived from a unit delay computation or from timing analysis.

40 Claims, 12 Drawing Sheets

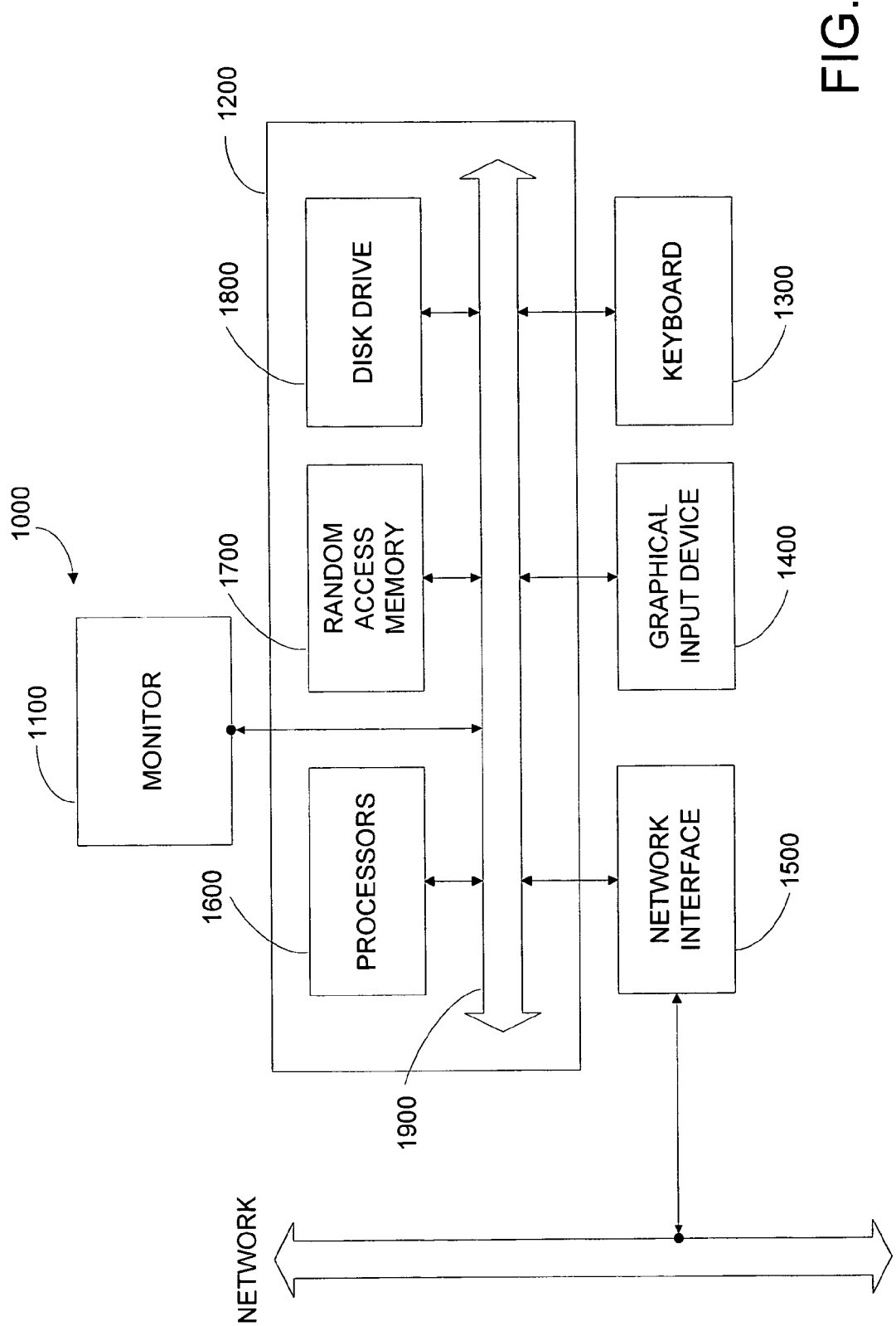

TIMING-DRIVEN SYNTHESIS WITH AREA TRADE-OFF

BACKGROUND OF THE INVENTION

The present invention relates to the field of programmable devices, and the systems and methods for programming the same. Programmable devices, such as FPGAs, typically includes thousands of programmable logic cells that use either a combination of logic gates or a look-up table to perform a logic operation. Programmable devices also include a number of functional blocks having specialized logic devices adapted to a specific logic operations. The logic cells and functional blocks are interconnected with a configurable switching circuit. The configurable switching circuit selectively routes connections between the logic cells and functional blocks. By configuring the combination of logic cells, functional blocks, and the switching circuit, a programmable device can be adapted to perform virtually any type of information processing function.

A typical design cycle for determining the configuration of a programmable device starts with an extraction phase, followed by a logic synthesis phase, a fitting phase, and an assembly phase. The extraction phase takes a user design, typically expressed as a netlist in a hardware description language such as verilog or VHDL, and produces a set of logic gates implementing the user design. In the logic synthesis phase, the set of logic gates is permutated over the hardware architecture of the programmable device in order to match elements of the user design with corresponding portions of the programmable device. The fitting or routing phase assigns the various portions of the user design to specific logic cells and functional blocks of the programmable device, taking care to satisfy the user timing constraints as much as possible. In the assembly phase, a configuration file defining the programmable device configuration is created. The configuration can then be loaded into a programmable device to implement the user design.

Typically, the logic synthesis phase optimizes the netlist describing a user design to minimize the usage of the programmable device hardware, for example the number logic cells or functional blocks. By minimizing the usage of programmable device hardware, referred to generally as area, the design can be implemented using the simplest and presumably least expensive programmable device. However, minimizing the area of a user design tends to create data paths that pass through a large number of logic cells and/or functional blocks. This in turn increases the delay on data paths and decreases the maximum operating speed of the user design.

Alternatively, some logic synthesis methods optimize strictly for maximum operating speed. Unfortunately, these methods substantially increase the area requirements for a user design. As a result, the cost to implement the speed-optimized user design also increases. Furthermore, many speed optimization techniques increase area so much that the performance improvements gained from using additional programmable device hardware are negated by the additional path-induced delays introduced by the increased area of the design. Thus, the actual speed increase from these methods often falls short of theoretical projections.

It is therefore desirable for a logic synthesis method to provide improved design performance without a substantial increase in design area. It is further desirable that a logic synthesis method enables users to select whether a design should be optimized for improved speed, decreased area, or a balance of these two goals.

BRIEF SUMMARY OF THE INVENTION

An embodiment of the invention is a logic synthesis method that provides improved user design performance without a substantial increase in user design area. Alternate factorizations are determined for portions of the user design. For each factorization, a delay metric is computed. The user design is optimized by selecting factorizations based on a balance of performance and area considerations. The optimized design is then mapped to the hardware architecture of the programmable device. A first portion of the user design is mapped to maximize performance, while a second portion of the user design is mapped to minimize area. The first portion of the user design includes a set of data paths each having a delay metric above a delay threshold. The delay metric can be derived from a unit delay computation or from timing analysis.

In an embodiment, a method of mapping a user design to a hardware architecture of a programmable device includes factoring the user design to optimize a critical path for maximum speed and a non-critical path for minimum area. The user design is resynthesized to optimize a set of fanout-free cones in the user design for maximum speed and cubes are extracted from the user design. The user design is mapped to the hardware architecture of the programmable device.

In a further embodiment, factoring the user design includes determining a set of possible algebraic factorizations for a portion of the user design and computing a delay metric for each of the set of possible algebraic factorizations and for the portion of the user design. In response to the delay metric of the portion of the user design being greater than a delay threshold, a first one of the set of possible algebraic factorizations having a delay metric less than the delay metric of the portion of the user design is substituted in place of the portion of the user design. In response to the delay metric of the portion of the user design being less than a delay threshold, a second one of the set of possible algebraic factorizations having an area less than an area of the portion of the user design and having a delay metric at most equal to the delay threshold is substituted in place of the portion of the user design.

In still a further embodiment, the first one of the set of possible algebraic factorizations may have a delay metric less than the delay threshold and an area less than an area of each of at least a portion of the set of possible algebraic factorizations and the area of the user design. Alternatively, the first one of the set of possible algebraic factorizations may have a delay metric greater than the delay threshold and less than the delay threshold of each of at least a portion of the set of possible algebraic factorizations.

In another embodiment, computing a delay metric includes assigning a delay value to each of a set of nodes in the algebraic factorization, wherein each of the set of nodes is associated with at least one of a set of data paths in the algebraic factorization. A total delay is determined for each of the set of data paths from the delay values of its associated nodes. The delay metric of the algebraic factorization is assigned as the delay value of one of the set of data paths that is greater than the delay value of each of at least a portion of the set of data paths as the delay metric of the algebraic factorization. The delay value may be based on a unit delay evaluation of a data path including the node or on a timing analysis of a data path including the node.

In an additional embodiment, mapping the user design to the hardware architecture of the programmable device includes creating a first mapping from a first portion of the user design to a first set of logic resources of the programmable device, such that the first mapping is optimized to maximize speed. A second mapping is created from a second portion of the user design to a second set of logic resources of the programmable device, such that the second mapping is optimized to minimize area. The first portion of the user design includes a set of data paths, each associated with at least one logic resource, wherein each of the set of data paths has a delay value above a delay threshold. In an embodiment, the delay value of the data path is proportional to the maximum number of serially connected logic resources associated with each data path.

BRIEF DESCRIPTION OF THE DRAWINGS

The invention will be described with reference to the drawings, in which:

FIG. 8 illustrates an example computing system suitable for use with an embodiment of the invention.

In the drawings, the use of like reference numbers indicates identical components.

DETAILED DESCRIPTION OF THE INVENTION

Figure 1:
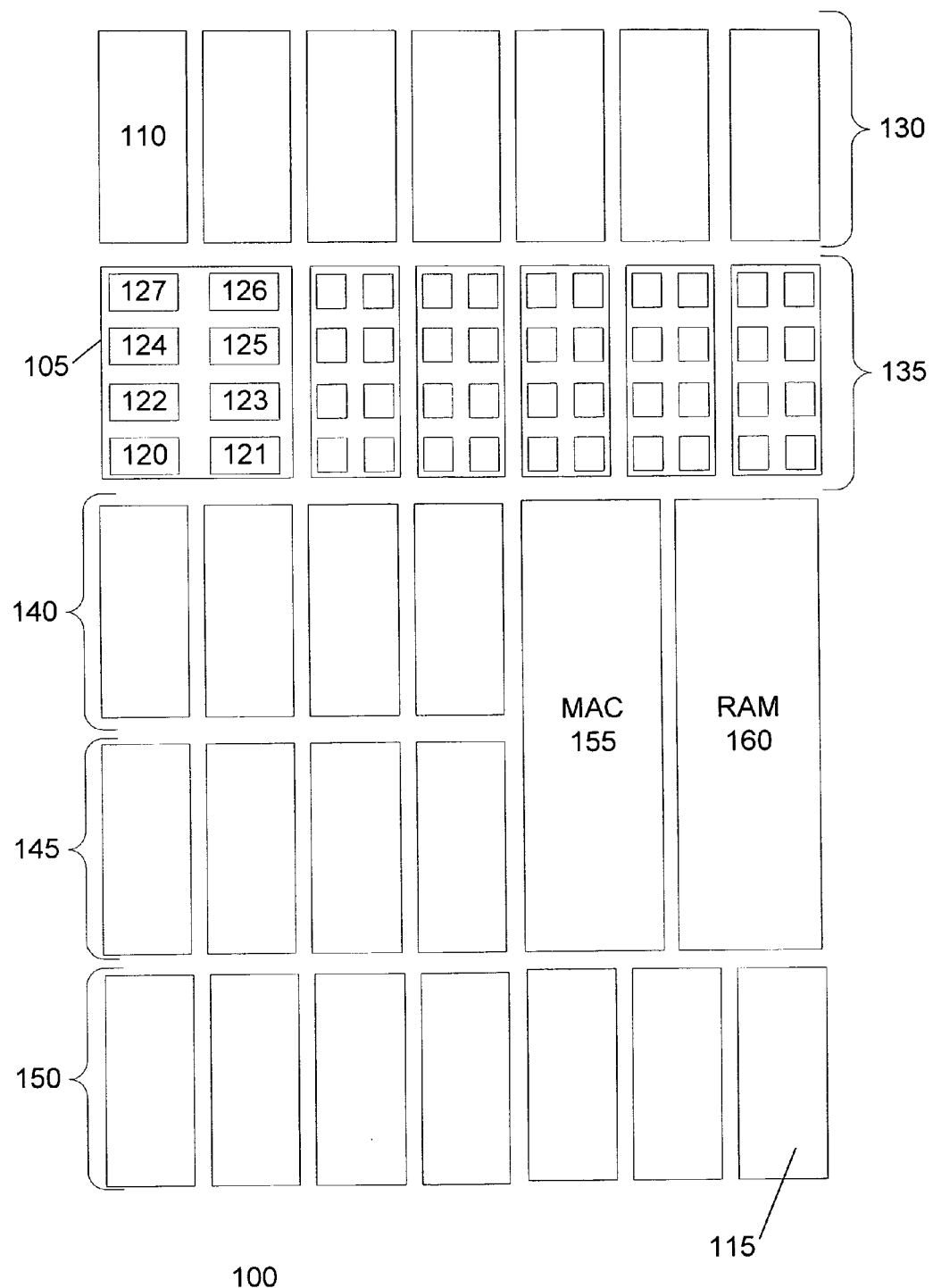
FIG. 1 illustrates a portion of an example programmable device suitable for use with an embodiment of the invention.

FIG. 1 illustrates a portion of an example programmable device 100 suitable for use with an embodiment of the invention. Programmable device 100 includes a number of logic array blocks (LABs), such as LABs 105, 110, 115. Each LAB includes a number of programmable logic cells using logic gates and/or look-up tables to perform a logic operation. LAB 105 illustrates in detail logic cells 120, 121, 122, 123, 124, 125, 126, and 127. Logic cells are omitted from other LABs in FIG. 1 for clarity. The LABs of device 100 are arranged into rows 130, 135, 140, 145, and 150. In an embodiment, the arrangement of logic cells within a LAB and of LABs within rows provides a hierarchical system of configurable connections, in which connections between logic cells within a LAB, between cells in different LABs in the same row, and between cell in LABs in different rows require progressively more resources and operate less efficiently.

In addition to logic cells arranged in LABs, programmable device 100 also include specialized functional blocks, such as multiply and accumulate block (MAC) 155 and random access memory block (RAM) 160. For clarity, the portion of the programmable device 100 shown in FIG. 1 only includes a small number of logic cells, LABs, and functional blocks. Typical programmable devices will include thousands or tens of thousands of these elements.

Figure 2:
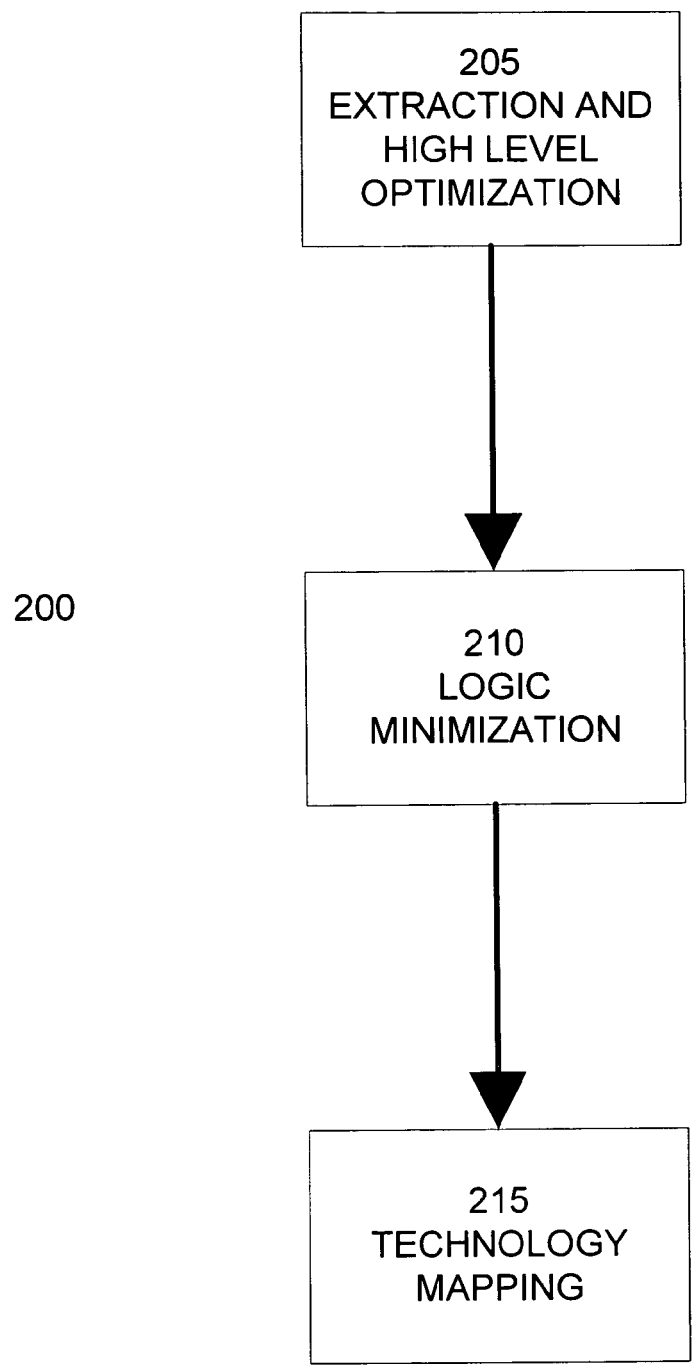
FIG. 2 illustrates a logic synthesis method according to an embodiment of the invention.

FIG. 2 illustrates a logic synthesis method 200 according to an embodiment of the invention. Step 205 receives a user design. In an embodiment, the user design is described as a gate-level description, which includes logic gates, registers, inputs and outputs generated by an extraction phase. Following step 205, step 210 performs a variety of logic minimization optimization techniques to optimize the gate-level description of the user design. According to an embodiment of the invention, step 210 optimizes the gate-level description for increased speed.

Technology mapping, step 215, converts the optimized gate-level description to a set of logic cells and other programmable device resources. Technology mapping, step 215, optimizes the conversion from logic gates to programmable device logic cells for increased speed, reduced area, or a combination of both goals.

As discussed in more detail below, both steps 210 and 215 generally optimize for operating speed by identifying timing-critical data paths in the user design and minimizing the number of logic gates or logic cells used by the critical paths. In an embodiment, a delay metric for a node of the user design is defined as the maximum delay of any combinatorial path through the node. The maximum delay for a given combinatorial path is proportional to the two-input logic gates connected in series on that path. For logic gates with additional inputs, the logic gate is decomposed into an equivalent set of two or more two-input logic gates for the purposes of computing delay. Similarly, when mapping a user design from logic gates to logic cells, the maximum delay for a given combinatorial path is proportional to the number of logic cells connected in series on that path.

Figure 3:
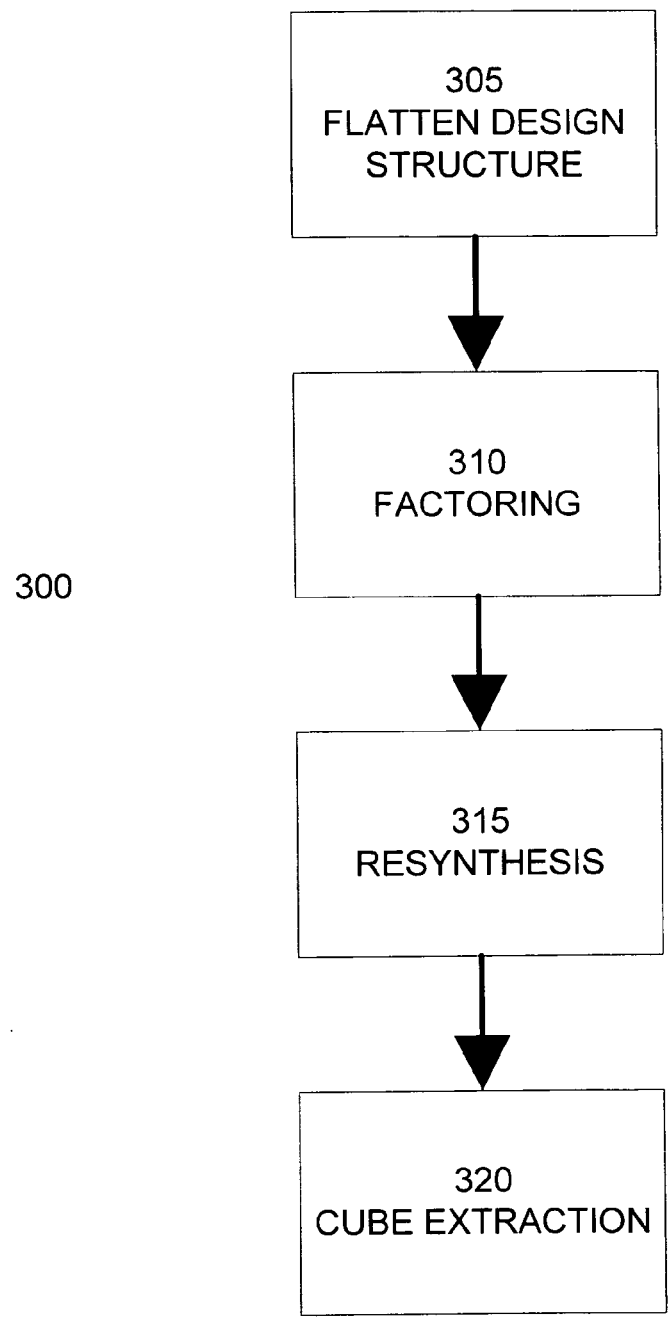
FIG. 3 illustrates a portion of a logic synthesis method according to an embodiment of the invention.

FIG. 3 illustrates a portion 300 of a logic minimization method according to an embodiment of the invention. Portion 300 includes four substeps of the multilevel synthesis step 210 described above. Step 305 flattens the user design by substituting portions of the gate-level design for functionally equivalent structures with fewer layers of gates. In an embodiment, step 305 replaces portions of the user design with an equivalent sum-of-products structure. In general, this sum-of-products substitution transforms a data path passing through a long series of logic gates into an equivalent data path having several shorter series of logic gates arranged in parallel. Step 305 is repeatedly applied to the user design until either all of the data paths have been shortened to a predetermined length or until a maximum number of logic gates has been reached.

Step 310 applies algebraic factoring to each sum-of-products expression in the user design. In general, previous factoring methods also increase the delay by increasing the number of logic gates in series in a data path. Step 310, in contrast, maximizes area savings by reducing the number of logic gates from the sum-of-products form of the user design while insuring that delays remain unchanged or potentially decrease.

In an embodiment, step 310 determines all possible algebraic factorizations of each sum-of-products expression in the user design. For the sum-of-products expression and each of the possible algebraic factorizations, step 310 determines the delay metric. Additionally, step 310 derives a critical delay threshold value from the maximum delay in the user design. In an embodiment, the critical delay threshold value is the maximum delay in the user design minus six. However, alternate embodiments can use other critical delay threshold values specifically adapted to the programmable device architecture.

Using the delay metric computed for the sum-of-products expression and each of the possible algebraic factorizations, step 310 then either leaves the original sum-of-products expression unchanged or substitutes one of the possible algebraic factorizations according to the following criteria. First, if the delay metric of the sum-of-products expression is greater than a critical delay threshold value and less than the delay metric of each of the possible algebraic factorizations, the sum-of-products expression is left unchanged. This ensures that the delay on timing-critical data paths is not increased by the factorization, 310.

If all or a subset of the possible algebraic factorizations have delay metrics less than the critical delay threshold value, then out of the subset of factorizations with delay metric smaller or equal to the critical delay threshold, step 310 substitutes the algebraic factorization having the smallest area for the sum-of-products expression in the user design. This optimization ensures that speed improved without unduly increasing the area of the design.

Finally, if the delay metric of the sum-of-products expression and the possible algebraic factorizations are greater than the critical delay threshold value, but the delay metrics of at least some of the possible algebraic factorizations are less than the delay metric of the sum-of-products expression, then step 310 selects the algebraic factorization having the smallest delay metric for substitution. In the case of multiple algebraic factorizations having equally minimum delay metrics, step 310 selects the algebraic factorization having the smallest area.

Figure 4A:
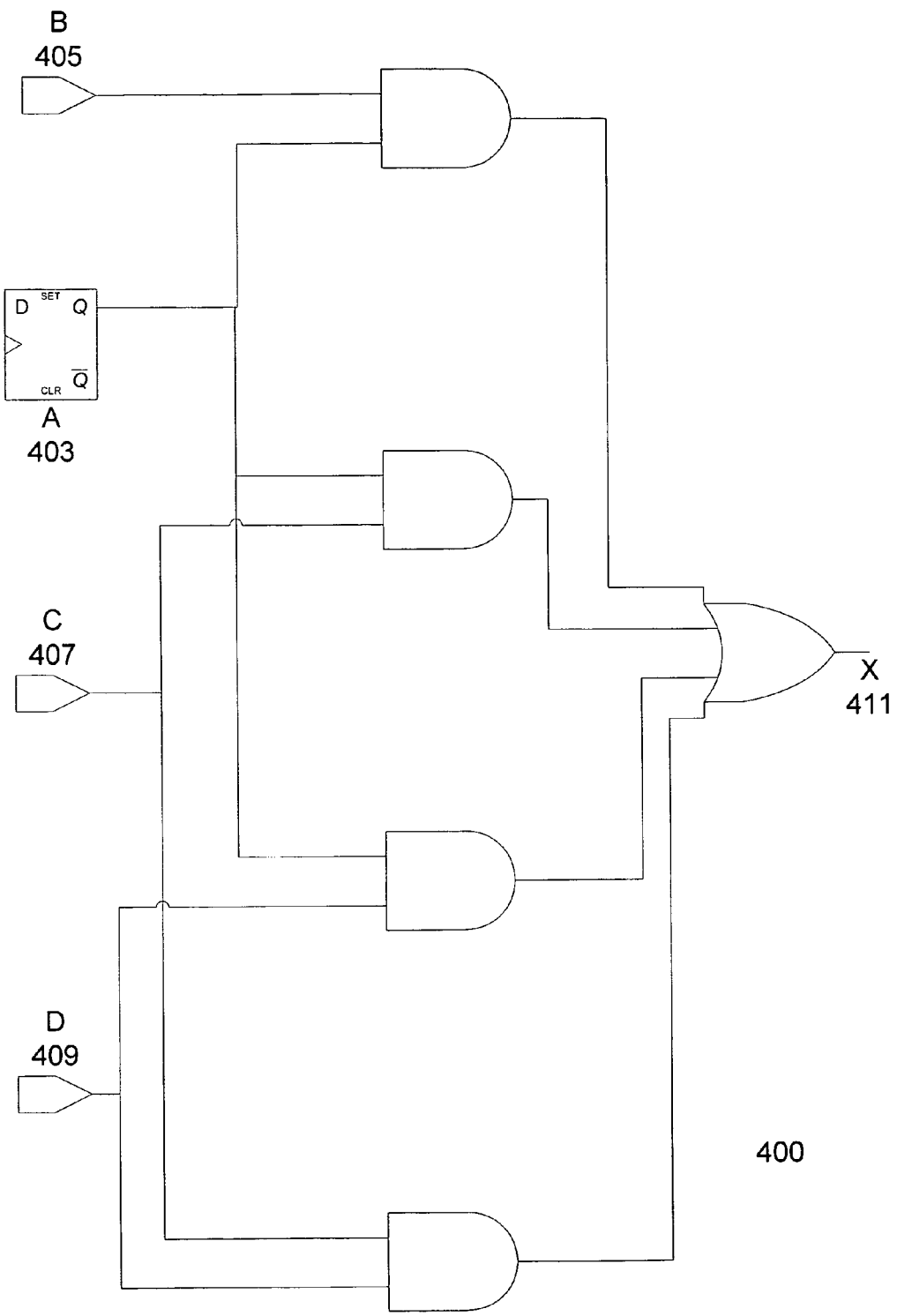
FIGS. 4A–4C illustrate an example application of a factoring portion of a logic minimization method according to an embodiment of the invention.
Figure 4B:
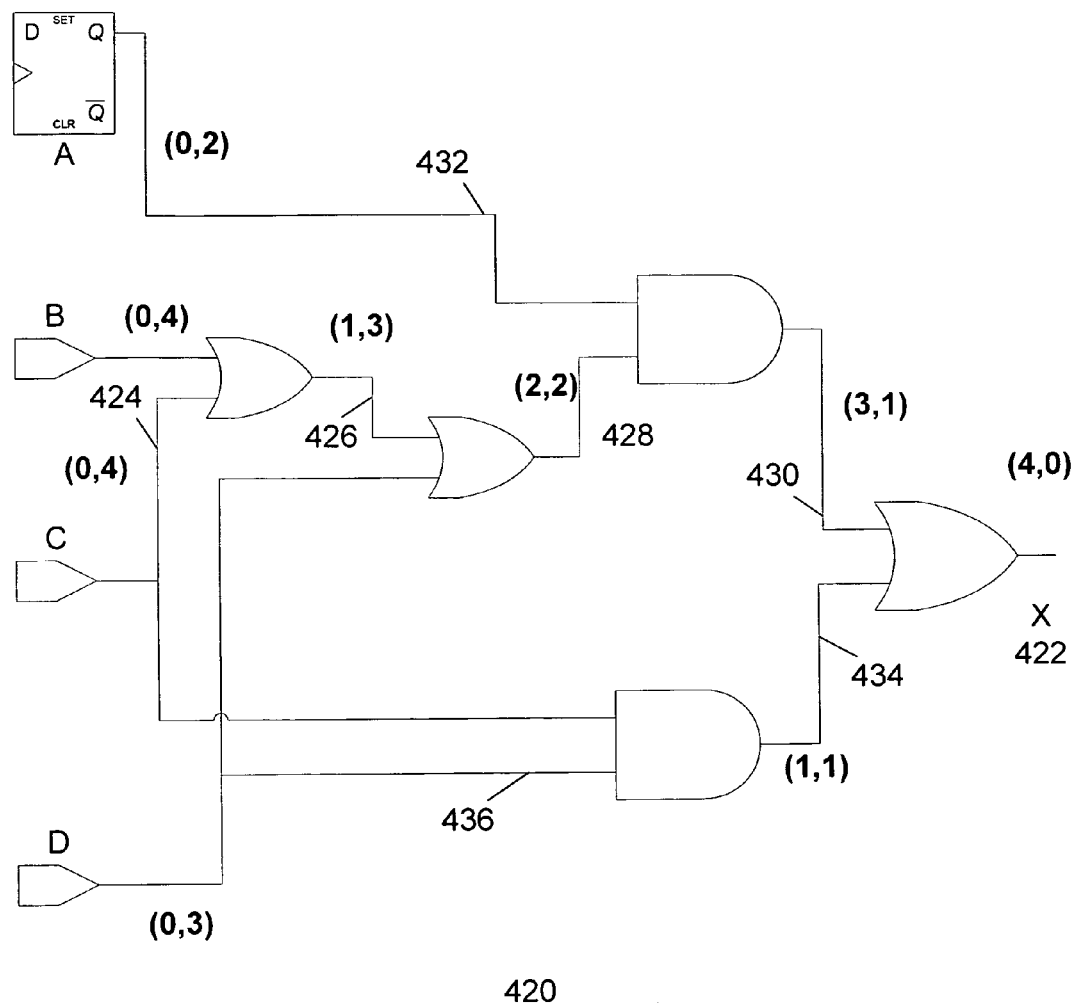
Figure 4C:
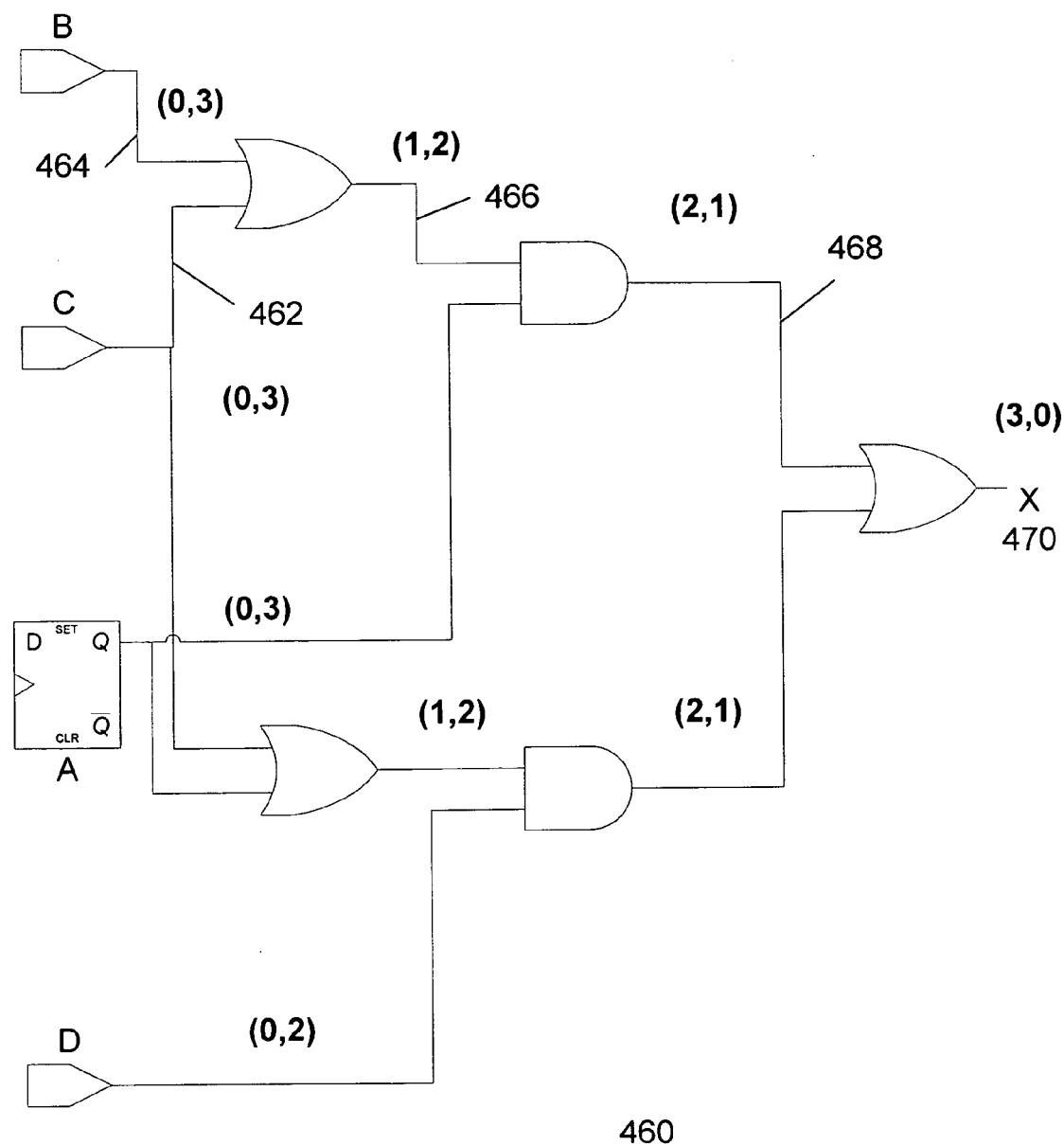

FIGS. 4A–4C illustrate an example application of a factoring portion of a logic minimization method according to an embodiment of the invention, such as that described by step 310. FIG. 4A illustrates a portion 400 of an example user design in sum-of-products form. Example portion 400 includes input register A, 403, and input pins B, 405, C, 407, and D, 409. The output X, 411, of example portion 400 can be expressed algebraically as X=AB+AC+AD+CD.

As discussed above, a delay metric is calculated for each possible factorization. One delay metric assigns a unit delay value for each logic gate in a path. For example, each logic gate increases the delay in a path by 1. The delay value at the output of a logic gate is the maximum delay value at the gate's inputs plus the unit delay, for example 1. In an alternate embodiment, timing analysis can be performed to provide a more accurate delay value for each logic gate in a path. The delay metric for a possible factorization is the delay value of the slowest, or critical, path.

FIG. 4B illustrates an example possible factorization 420 of the portion 400 discussed above. The output X, 422, of factorization 420 can be expressed algebraically as X=A(B+C+D)+CD. Factorization 420 is functionally equivalent to portion 400. In an embodiment, the fan-in delay, which is the maximum delay from any input to a node, and the fan-out delay, which is the maximum delay from the node to any output, is calculated for each node of a factorization. For factorization 420, the fan-in delay of node 424 is 0, because there are zero gates between node 424 and an input, and the fan-out delay is 4, because there are four gates between node 424 and the output 422. The combination of 0 fan-in delay and 4 fan-out delay may be abbreviated in the figures as (0,4). Continuing along the same path, node 426 has delay values of (1,3), node 428 has delay values of (2,2), node 430 has delay values of (3,1), and node 422, which is the output of factorization 420, has delay values of (4,0). For any node in a factorization, the total path delay value for a path including the node is the sum of the node's fan-in and fan-out delay values. Nodes 432, 434, and 436 have delay values of (0,2), (1,1), and (0,3), respectively, and therefore are on paths having delays of 2, 2, and 3, respectively. In contrast, the total path delay for the path including nodes 424, 426, 428, 430, and output 422 is 4. In the example of FIG. 4B, this path is the critical path and is the maximum delay of factorization 420.

FIG. 4C illustrates another example possible factorization 460 of the portion 400 discussed above. The output X, 470, of factorization 460 can be expressed algebraically as X=A(B+C)+D(A+C). Factorization 460 is functionally equivalent to portion 400. The fan-in and fan-out delay of each node of factorization 460 is calculated as discussed above. In example possible factorization 460, the slowest, or critical, paths have a delay value of 3. In factorization 460, one of the critical paths is the path including nodes 464, 466, 468, and output 470.

Applying the factoring portion of a logic minimization method, such as that described by step 310, to the example of FIGS. 4A–4C, if the delay metric of the portion 400 and the possible algebraic factorizations 420 and 460 are greater than the critical delay threshold value, but the delay metrics of at least some of the possible algebraic factorizations 420 and 460 is less than the delay metric of the sum-of-products expression, then step 310 selects the factorization 460, which has the smallest delay metric, for substitution in place of portion 400 in the user design.

Similarly, if both possible factorizations 420 and 460 have delay metrics less than the critical delay threshold value, then step 310 substitutes the algebraic factorization having the smallest area for the sum-of-products expression in the user design. If the delay metric of portion 400 is greater than a critical delay threshold value and less than the delay metrics of possible algebraic factorizations 420 and 460, then step 310 leaves portion 400 unchanged.

Continuing with the portion 300 of the logic minimization method discussed above, step 315 applies a resynthesis operation to the factored form of the user design. The resynthesis operation of step 315 determines a fanout-free cone for each logic gate in the user design. A fanout-free cone includes one selected logic gate and a set of connected logic gates, each of which has one or more fanouts only connected, directly or indirectly, with an input of the selected logic gate. For a selected logic gate, the maximum fanout-free cone is the fanout-free cone having the largest possible set of connected logic gates.

Figure 5:
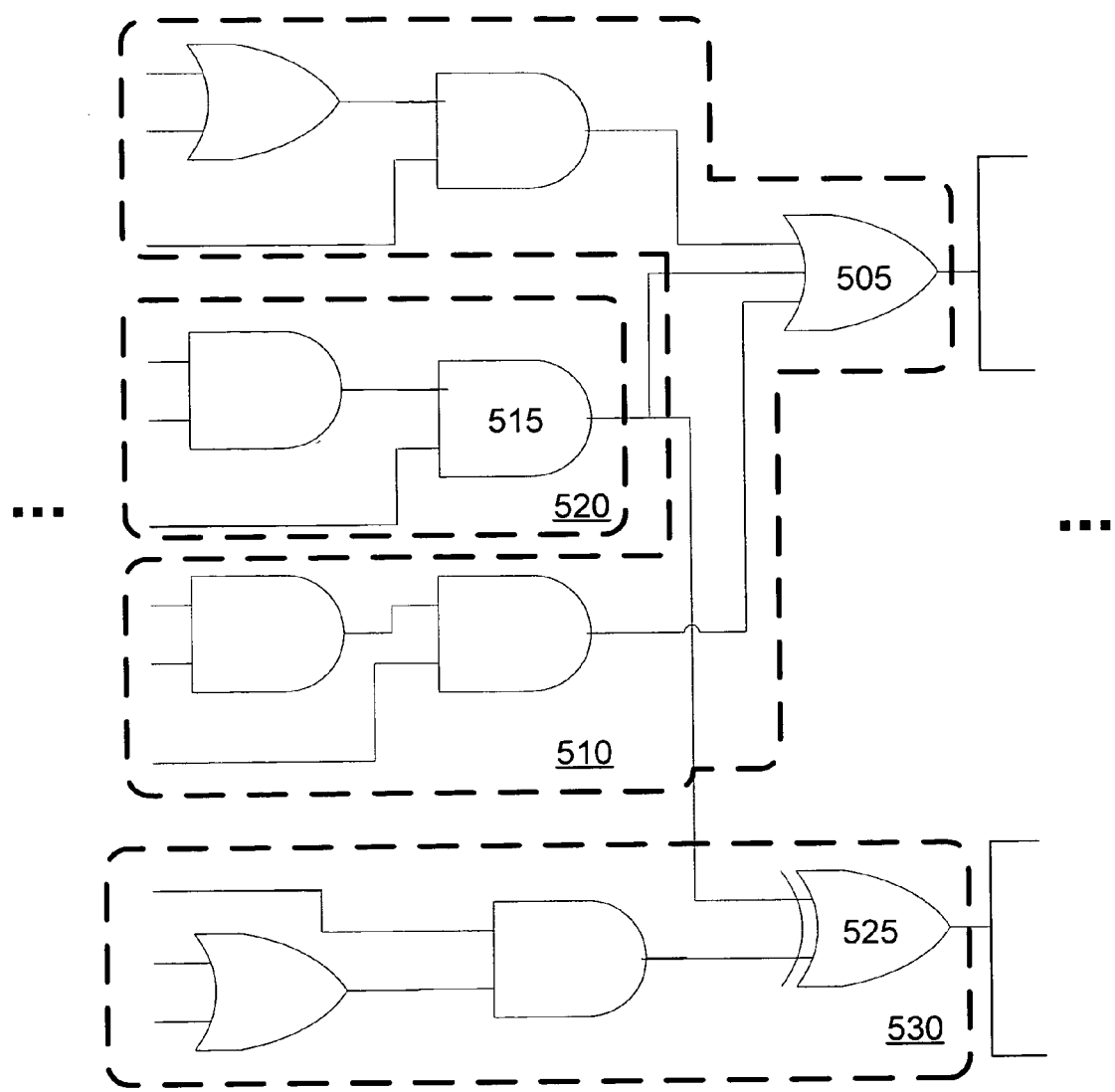
FIG. 5 illustrates an example application of a resynthesis portion of a logic minimization method according to an embodiment of the invention.

FIG. 5 illustrates an example portion 500 of a user design and the associated set of fanout-free cones. Logic gate 505 has two fanouts. The fanout-free cone 510 includes the logic gate 505 and all of the logic gates connected with the inputs of logic gate 505 and having only one output. For example, although logic gate 515 is connected with logic gate 505, logic gate 515 is excluded from fanout-free cone 510 because it is also connected with logic gate 525, which is not connected with logic gate 505. Similarly, logic gates 515 and 525 are associated with fanout-free cones 520 and 530, respectively.

In an embodiment, step 315 iterates through all logic gates in the user design in topological order, starting at the inputs of the user design. For each logic gate, step 315 first selects the maximum fanout-free cone and calculates a delay metric in a manner similar to that described above. Step 315 then transforms the logic gates of the fanout-free cone into a sum-of-products form. Once in sum-of-products form, step 315 determines all possible algebraic factorizations of the fanout-free cone, in a manner similar to that described above.

For each possible algebraic factorization, step 315 calculates a delay metric. Step 315 then selects one of the factorizations in the same manner as discussed above. If the delay metrics of the possible algebraic factorizations are greater than the critical delay threshold value, then step 315 selects the factorization that has the smallest delay metric. Similarly, if the delay metrics of at least some of the possible algebraic factorizations are less than the critical delay threshold, then step 315 selects the factorization having a delay metric less than the critical delay threshold and having the smallest area. This factoring is repeated on the sum-of-products form of the fanout-free cone, reducing it to one or more smaller sum-of-products expressions until no more sum-of-products expressions can be factored.

Step 315 then decides whether to replace the unfactored fanout-free cone with the selected factorized form of the fanout-free cone. If the delay metric of the unfactored fanout-free cone is greater than the delay threshold, then step 315 replaces the unfactored fanout-free cone with the selected factorization only if the selected factorization has a delay metric smaller than the delay metric of the unfactored fanout-free cone or if the selected factorization has a delay metric equal to the delay metric of the unfactored fanout-free cone and has a smaller area than the area of the unfactored fanout-free cone. If the delay metric of the fanout-free cone is less than or equal to the delay threshold, then step 315 replaces the unfactored fanout-free cone with the selected factorization if the delay metric of the selected factorization is less than or equal to the delay threshold and the area of the selected factorization is smaller than the area of the unfactored fanout-free cone.

Step 315 is repeated for each fanout-free cone in the user design. Following step 315, step 320 performs cube extraction on the user design. Cube extraction evaluates different extractions of common AND- and OR-gates of portions of the user design. In an embodiment, step 320 computes a delay metric for each of a set of possible alternative cube extractions for a portion of the user design. If the delay metrics for the set of possible alternative cube extractions are greater than a critical delay threshold, then step 320 selects the cube extraction with the smallest delay. If the delay metrics for at least a portion of the set of possible alternative cube extractions are less than or equal to the critical delay threshold, step 320 selects the cube extraction with the smallest area and a delay metric less than or equal to the delay threshold. Step 320 is repeated for additional portions of the user design.

Figure 6:
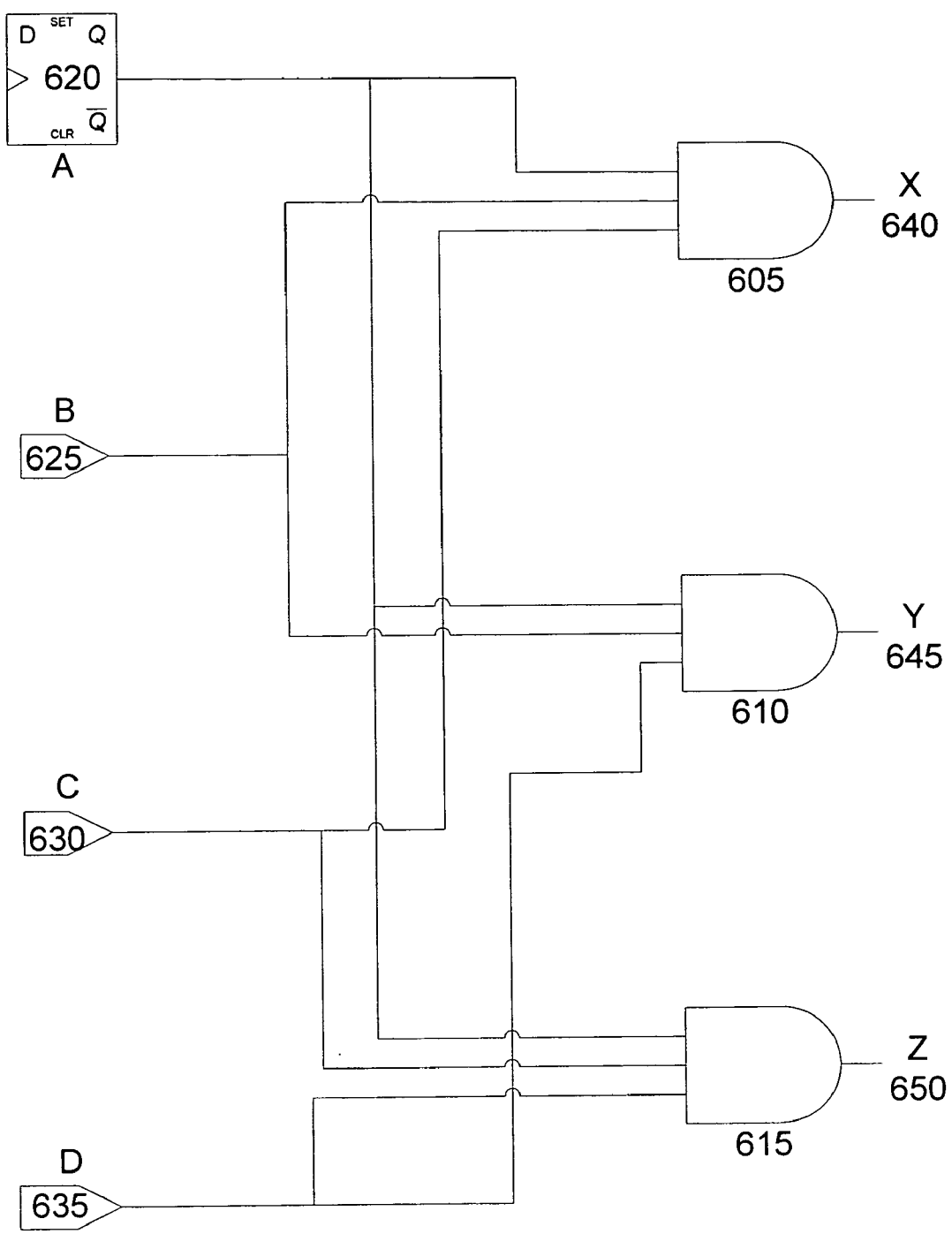
FIG. 6 illustrates an example application of a cube extraction portion of a logic minimization method according to an embodiment of the invention.

FIG. 6 illustrates a portion 600 of an example user design to which cube extraction of step 320 can be applied. In portion 600, logic gate 605 is connected with inputs A, 620, B, 625, and C, 630, and output X; logic gate 610 is connected with inputs A, 620, B, 625, and D, 635, and output Y, 645; and logic gate 615 is connected with inputs A, 620, C, 630, and D, 635, and output Z, 650. The portion 600 of the example user design implements expressions X=ABC, Y=ABD, and Z=ACD.

In this example, the subexpression AB is common to both X and Y, and the subexpression AD is common to both Y and Z. To reduce the number and complexity of gates in the user design, either subexpression can be implemented as a separate gate used to determine the output of two of the three expressions in portion 600. However, it would be wasteful to implement both subexpressions as separate gates, as there would be no reduction in the total number of gates. Applying step 320 to portion 600 of the user design, an embodiment of step 320 will implement the subexpression that minimizes the delay. In another embodiment, step 320 will implement the subexpression that minimizes the area requirements of the user design.

Following step 320, additional standard logic minimization operations may be performed to further optimize the user design to minimize area. Once the logic minimization is complete, technology mapping, discussed in step 215 above, converts the optimized gate-level description to a set of logic cells and other programmable device resources. In an embodiment, technology mapping, step 215, optimizes the conversion from logic gates to programmable device logic cells for increased speed, reduced area, or a combination of both goals.

In general, technology mapping assigns groups of logic gates in the user design to the capabilities of logic resources, such as logic cells or other hardware, in a programmable device. The assignment of groups of gates to logic resources is not necessarily exclusive; therefore, a logic gate can be assigned to two or more logic cells. For example, typical logic cells of a programmable device each use a four-input one-output look-up table to emulate a set of logic gates. In this example, technology mapping covers all logic gates in the user design with logic cells, such that each logic cell covers a connected set of logic gates with at most four inputs. Furthermore, the inputs and outputs of logic cells are connected such that every logic cell input is connected with the output of another logic cell, a register, another logic resource, or an input or output pin.

Other programmable devices can use logic cells having more or less inputs, or logic cells using different combinations of logic gates, look-up tables, or other components to emulate a set of logic gates of the user design. In a further embodiment, dedicated memory blocks available on the programmable device and unused by the user design can be exploited as logic cells to emulate larger groups of logic gates, for example groups having additional inputs.

To optimize for minimum area only, technology mapping forms and assigns groups of logic gates to minimize the number of logic cells used. To optimize for maximum speed, technology mapping forms and assigns groups of logic gates to minimize the maximum depth of the logic cells in the user design, which is the number of logic cells connected in series in the user design. In an embodiment of the invention, a balanced technology mapping method optimizes the user design for both speed and area. Typically, the speed of the user design resulting from this balanced technology mapping method is close to that provided by speed-only optimizations, while the area requirements of the user design is only slightly increased from that resulting from area-only optimizations.

Figure 7A:
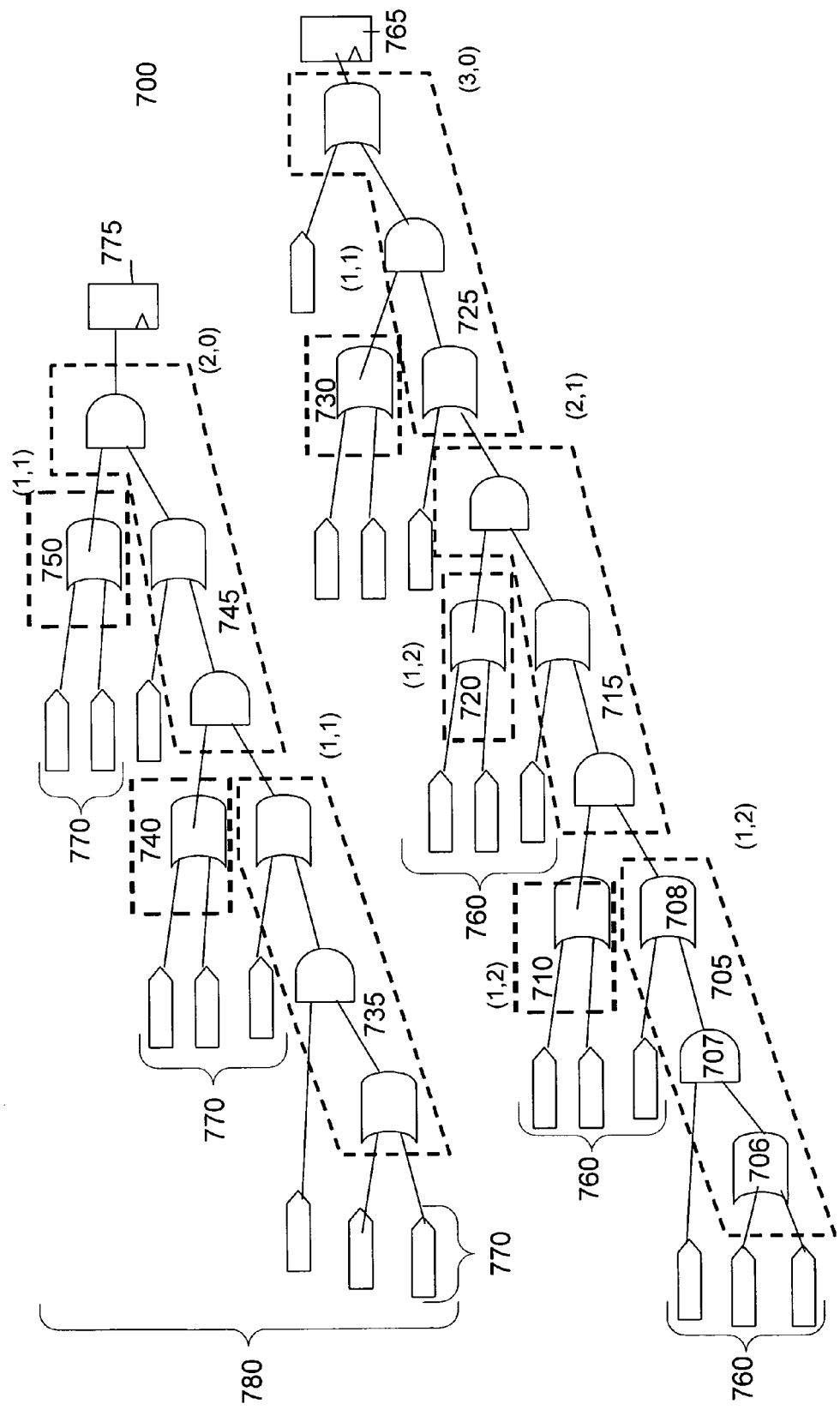
FIGS. 7A–7C illustrate an example application of a technology mapping portion of a logic synthesis method according to an embodiment of the invention.
Figure 7B:
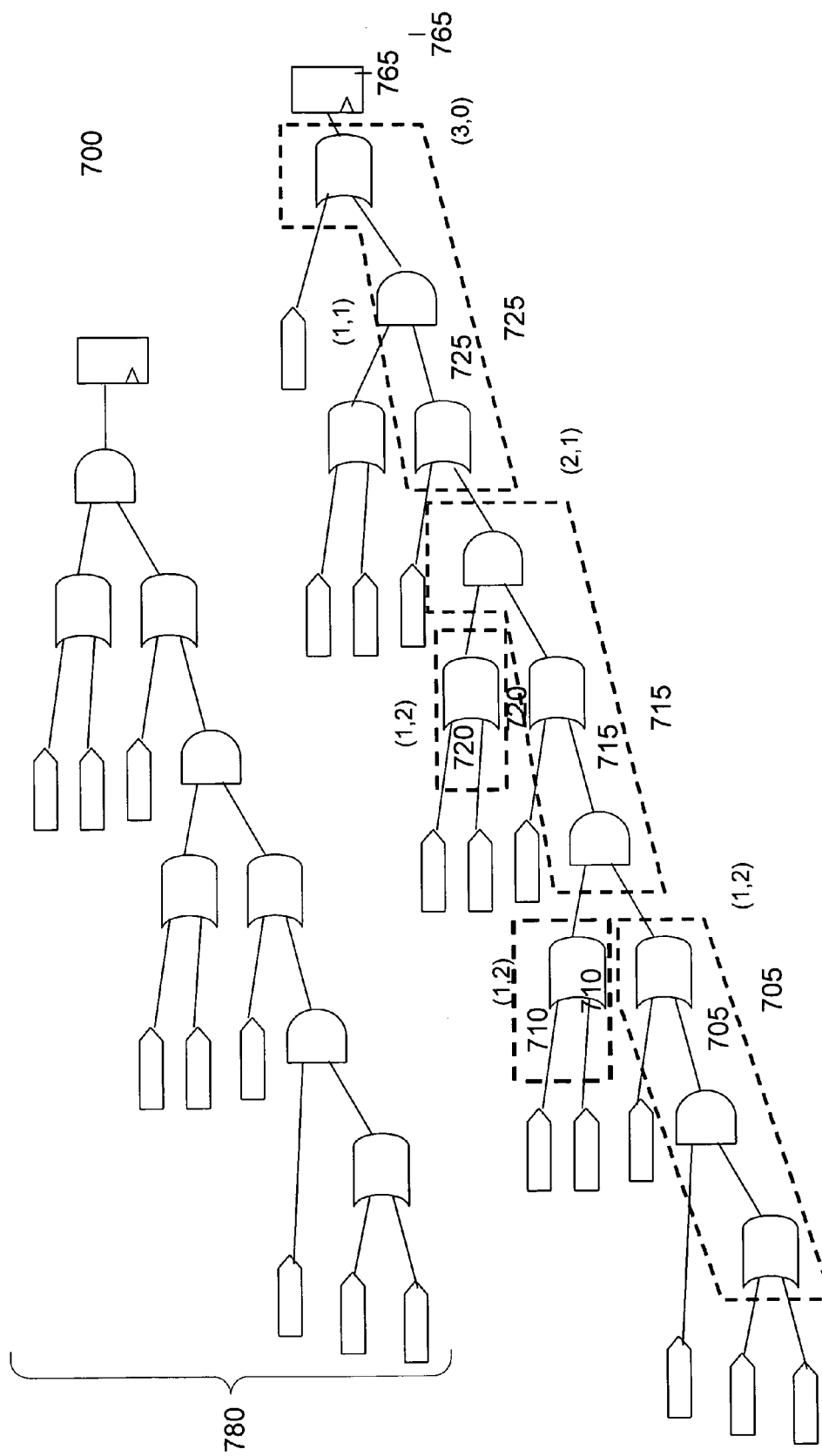
Figure 7C:
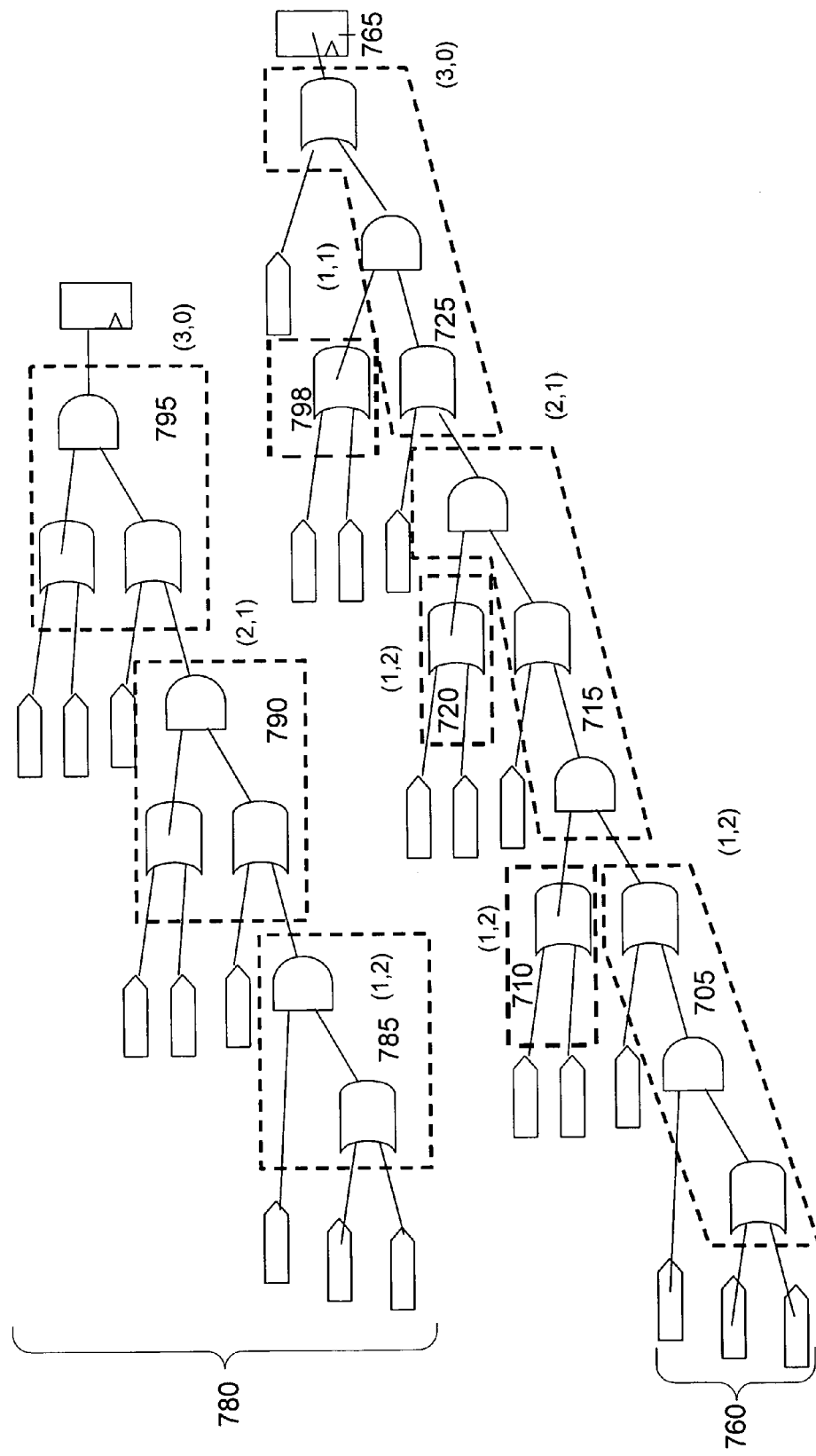

FIGS. 7A–7C illustrate an example application of a technology mapping portion of a logic synthesis method according to an embodiment of the invention. FIG. 7A illustrates a portion 700 of a user design. Portion 700 includes a number of logic gates. In an embodiment, the balanced technology mapping method first groups the logic gates in the user design to minimize the maximum depth of the logic cells in the user design, for example in a similar manner to optimizing for speed only. In the example of FIG. 7A, portion 700 includes logic cells 705, 710, 715, 720, 725, 730, 735, 740, 745, and 750. In this figure, each logic cell emulates the logic gates shown within its boundaries. For example, logic cell 705 emulates logic gates 706, 707, and 708.

For each data path in the user design, an embodiment of the balanced technology mapping method computes fan-in and fan-out delay metrics for each logic cell. The fan-out delay metric for a given logic cell is the maximum delay from the output of the given logic cell to any output pin, register input, or other logic resource input and the fan-in delay for a given logic cell is the maximum delay from any input pin, register output, or other logic resource output, such as a memory, to the output of the given logic cell. One embodiment of a delay metric assigns a unit delay value, for example 1, for each logic cell in a path. For example, logic cell 705 has a fan-in delay of 1 and a fan-out delay of 2, which together can be written as (1,2). In the example of user design 700, the data path between inputs 760 and output 765 has a total delay of three. Similarly, the data paths between inputs 770 and output 775 is only two. Alternatively, a timing analysis can be performed to compute the delay metric.

The balanced technology mapping method computes a delay metric for each logic cell used by the user design. Then the balanced technology mapping method ranks each data path by its delay metric. For the data paths having the highest delay values, the method designates the data paths as critical paths and keeps the assignment of logic cells unchanged. In one embodiment, the data paths within predetermined percentile of delay metrics are critical paths and the associated logic cell assignments are left unchanged. For example, the data paths having delay metrics in the top 10% of all delay metrics computed for the data paths of the user design are designated as critical paths.

For the non-critical data paths, an embodiment of the balanced technology mapping method discards the logic cell assignments for logic gates. These logic gates on non-critical paths are then reassigned to new logic cells to minimize the total number of logic cells used, and hence minimize the area required by the user design.

Continuing with the example of user design 700, the data path between inputs 760 and output 765, with a total delay of three, is the critical path. Conversely, the data paths between inputs 770 and output 775 are non-critical paths. For the data path between inputs 760 and output 765, the associated logic cell assignments 705, 710, 715, 720, and 725 are left unchanged. For the non-critical data paths between inputs 770 and output 775, the logic cell assignments 735, 740, 745, and 750 are discarded. Logic cell 730 and its inputs are not part of the critical path, so it is discarded as well. FIG. 7B illustrates the user design 700 with the critical path assigned to logic cells 705, 710, 715, 720, and 725. The remaining portion 780 of the user design 700 is unassigned to logic cells.

The balanced technology mapping method then groups the remaining unassigned portion of the user design to a new set of logic cells, taking care to minimize the total number of logic cells used. FIG. 7C illustrates the reassignment of the remaining portion 780 of the user design 700 to a new set of logic cells. In FIG. 7C, the logic gates of remaining portion 780 are assigned to logic cells 785, 790, 795, and 798. The logic cell assignments for the data path between inputs 760 and output 765 remains unchanged. In this example, although logic cell assignment 798 is identical to the discarded logic cell assignment 730; the reassignment of the remaining portion 780 of the user design, as demonstrated by logic cell assignments 785, 790, and 795, often results in different logic cell assignments. The combination of logic cells 705, 710, 715, 720, and 725 with the logic cells 785, 790, 795 and 798 form a balanced technology mapping of the user design 700.

Using the balanced technology mapping method, the non-critical data paths between inputs 770 and output 775 require only three logic cells. In contrast, the speed-optimized logic cell assignment used in FIG. 7A for the non-critical data paths required four logic cells. Moreover, although the logic cell assignment for remaining portion 780 in FIG. 7C increases the delay from two to three for the data paths between inputs 770 and output 775, the overall speed of the user design 700 is not affected because the critical path between inputs 760 and output 765 also has a delay of three. Thus, in this example, the speed of the user design 700 is the same as if the user design 700 were optimized strictly for speed, while requiring fewer logic cells. For more complicated user designs, the balanced technology mapping method can substantially improve the speed of user designs with minimal affect on area, as compared to the prior area-driven technology mapping methods.

It should be noted that the assignment of logic gates to logic cells determines the allocation of portions of the user design amongst logic cells; in an embodiment, the fitting or routing of logic cells, which is designation of logic cell assignments to specific logic cells on a programmable device while minimizing the length and number of connections needed by the configurable switching circuit, is done at a later stage. Furthermore, as noted above, logic gates can be assigned to multiple logic cells to optimize performance or improve fitting.

FIG. 8 illustrates an example computer system 1000 capable of implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more general purpose processors 1600, and memory storage devices, such as a random access memory (RAM) 1700, disk drives 1800, and system bus 1900 interconnecting the above components. RAM 1700 and disk drive 1800 are examples of tangible media for storage of data, audio/video files, computer programs, applet interpreters or compilers, virtual machines, and embodiments of the herein described invention. Further embodiments of computer 1200 can include specialized input, output, and communications subsystems for configuring, operating, testing, and communicating with programmable devices. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. For example, although the invention has been discussed with reference to programmable devices, it is equally applicable to logic minimization applications used to design any type of digital device, such as standard or structured ASICs, gate arrays, and general digital logic devices. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of mapping a user design to a hardware architecture of a programmable device, the method comprising:
    factoring the user design to optimize a critical path for maximum speed and a non-critical path for minimum area;
    resynthesizing the user design to optimize a set of fanout-free cones associated with a critical path in the user design for maximum speed;
    extracting cubes from the user design; and
    mapping the user design to the hardware architecture of the programmable device.

2. The method of claim 1, wherein the factoring the user design comprises:
    determining a set of possible algebraic factorizations for a portion of the user design;
    computing a delay metric for each of the set of possible algebraic factorizations and for the portion of the user design;
    in response to the delay metric of the portion of the user design being greater than a delay threshold, substituting a first one of the set of possible algebraic factorizations having a delay metric less than the delay metric of the portion of the user design in place of the portion of the user design; and
    in response to the delay metric of the portion of the user design being less than a delay threshold, substituting a second one of the set of possible algebraic factorizations having an area less than an area of the portion of the user design and having a delay metric at most equal to the delay threshold.

3. The method of claim 2, wherein the first one of the set of possible algebraic factorizations has a delay metric less than the delay threshold and an area less than an area of each of at least a portion of the set of possible algebraic factorizations and an area of the portion of the user design.

4. The method of claim 2, wherein the first one of the set of possible algebraic factorizations has a delay metric greater than the delay threshold and less than the delay metric of each of at least a portion of the set of possible algebraic factorizations.

5. The method of claim 2, wherein the computing a delay metric comprises:
    assigning a delay value to each of a set of nodes in a possible algebraic factorization, wherein each of the set of nodes is associated with at least one of a set of data paths in the possible algebraic factorization;
    determining a total delay for each of the set of data paths from the delay values of its associated nodes; and
    assigning the delay value of one of the set of data paths that is greater than the delay value of each of at least a portion of the set of data paths as the delay metric of the possible algebraic factorization.

6. The method of claim 5, wherein the delay value of each of the set of nodes is based on a unit delay evaluation of a data path including its associated node.

7. The method of claim 5, wherein the delay value of each of the set of nodes is based on a timing analysis of a data path including its associated node.

8. The method of claim 1, wherein the resynthesizing the user design comprises:
    determining a set of fanout-free cones in the user design;
    for each of the set of fanout-free cones, determining an associated set of possible algebraic factorizations;
    computing a delay metric for each of the associated set of possible algebraic factorizations;
    selecting one of the set of possible algebraic factorizations, in response to the one of the associated set of possible algebraic factorizations having a delay metric less than the delay metrics of at least a portion of the associated set of possible algebraic factorizations and greater than a delay threshold or in response to the one of the associated set of possible algebraic factorizations having a delay metric less than or equal to the delay threshold and an area less than an area of each of at least a portion of the associated set of possible algebraic factorizations; and
    substituting the selected one of the associated set of possible algebraic factorizations in place of the associated one of the associated set of fanout-free cones, in response to the associated one of the associated set of fanout-free cones having a delay metric greater than the delay threshold and greater than the delay threshold of the selected one of the associated set of possible algebraic factorizations or in response to the associated one of the set of fanout-free cones having a delay metric less than or equal to the delay threshold and an area greater than the area of the selected one of the set of possible algebraic factorizations.

9. The method of claim 8, wherein the computing a delay metric comprises:
    assigning a delay value to each of a set of nodes in the a possible algebraic factorization, wherein each of the set of nodes is associated with at least one of a set of data paths in the possible algebraic factorization;
    determining a total delay for each of the set of data paths from the delay values of its associated nodes; and
    assigning the delay value of one of the set of data paths that is greater than the delay value of each of at least a portion of the set of data paths as the delay metric of the possible algebraic factorization.

10. The method of claim 9, wherein the delay value of each of the set of nodes is based on a unit delay evaluation of a data path including its associated node.

11. The method of claim 9, wherein the delay value of each of the set of nodes is based on a timing analysis of a data path including its associated node.

12. The method of claim 1, wherein the mapping the user design to the hardware architecture of the programmable device comprises:
    creating a first mapping from a first portion of the user design to a first set of logic resources of the programmable device, such that the first mapping is optimized to maximize speed; and
    creating a second mapping from a second portion of the user design to a second set of logic resources of the programmable device, such that the second mapping is optimized to minimize area.

13. The method of claim 12, wherein the first portion of the user design includes a set of data paths, each associated with at least one logic resource, wherein each of the set of data paths has a delay value above a delay threshold.

14. The method of claim 13, wherein the delay value of the data path is proportional to the maximum number of serially connected logic resources associated with each data path.

15. The method of claim 1, wherein the extracting cubes from the user design includes:
   computing a delay metric for each of a set of possible alternative cube extractions for a portion of the user design;
   selecting one of the set of possible alternative cube extractions having a delay metric less than the delay metrics of at least a portion of the set of possible alternative cube extractions in response to the set of possible alternative cube extractions having delay metrics greater than a delay threshold; and
   selecting one of the set of possible alternative cube extractions having a delay metric less than or equal to the delay threshold and having an area less than an area of each of at least a portion of the set of possible alternative cube extractions in response to at least a portion of the set of possible alternative cube extractions having delay metrics less than or equal to the delay threshold.

16. The method of claim 15, wherein the delay value of each of the set of possible alternative cube extractions is based on a unit delay evaluation of a data path including its associated possible alternative cube extraction.

17. The method of claim 15, wherein the delay value of each of the set of possible alternative cube extractions is based on a timing analysis of a data path including its associated possible alternative cube extraction.

18. A method of mapping a user design to a hardware architecture of a programmable device, the method comprising:
   factoring the user design;
   resynthesizing the user design;
   extracting cubes from the user design;
   determining a first mapping of the user design, the first mapping dividing the user design into a first set of logic gate groups, wherein each of the first set of logic gate groups matches capabilities of a logic resource of the programmable device and is associated with at least one of a set of data paths in the user design;
   calculating a delay metric for each of the set of data paths;
   selecting a portion of the set of data paths each having a delay metric greater than a delay threshold;
   selecting a portion of the first set of logic gate groups associated with the selected portion of the set of data paths;
   removing the selected portion of the first set of logic gate groups from the user design, thereby creating a reduced user design;
   determining a set of alternate mappings of the reduced user design, each alternate mapping dividing the reduced user design into a second set of logic gate groups, wherein each of the second set of logic gate groups matches the capabilities of a logic resource of the programmable device;
   determining an area requirement for each of the set of alternate mappings of the reduced user design; and
   selecting one of the set of alternate mappings of the reduced user design, wherein the area requirement of the selected one of the set of alternate mappings is less than each of the area requirements of a portion of the set of alternate mappings.

19. The method of claim 18, wherein the area requirement of an alternate mapping is proportional to number of logic gate groups in the alternate mapping.

20. The method of claim 18, further comprising:
   assigning the selected portion of the set of logic gate groups to a first set of matching logic resources of the programmable device; and
   assigning the second set of logic gate groups associated with the selected alternate mapping to a second set of matching logic resources of the programmable device.

21. The method of claim 18, wherein the first mapping of the user design is optimized to minimize the maximum number of logic gate groups connected in series.

22. The method of claim 18, wherein the logic resource is a logic cell.

23. The method of claim 18, wherein the logic resource is a memory device.

24. The method of claim 18, wherein the calculating a delay metric comprises:
   assigning a delay value to each of the set of logic gate groups; and
   determining a total delay for each of the set of data paths from the delay values of its associated logic gate groups.

25. The method of claim 24, wherein the delay value of each of the set of logic gate groups is based on a unit delay evaluation of its associated data paths.

26. The method of claim 24, wherein the delay value of each of the set of logic gate groups is based on a timing analysis of its associated data paths.

27. An information storage medium including a set of instructions adapted to operate an information processing device to perform a set of steps, for mapping a user design to a hardware of a programmable device the set of steps comprising:
   factoring the user design to optimize a critical path for maximum speed and a non-critical path for minimum area;
   resynthesizing the user design to optimize a set of fanout-free cones in the user design for maximum speed;
   extracting cubes from the user design; and
   mapping the user design to the hardware architecture of the programmable device.

28. The information storage medium of claim 27, wherein the factoring the user design comprises:
   determining a set of possible algebraic factorizations for a portion of the user design;
   computing a delay metric for each of the set of possible algebraic factorizations and for the portion of the user design;
   in response to the delay metric of the portion of the user design being greater than a delay threshold, substituting a first one of the set of possible algebraic factorizations having a delay metric less than the delay metric of the portion of the user design in place of the portion of the user design; and
   in response to the delay metric of the portion of the user design being less than a delay threshold, substituting a second one of the set of possible algebraic factorizations having an area less than an area of the portion of the user design and having a delay metric at most equal to the delay threshold.

29. The information storage medium of claim 28, wherein the first one of the set of possible algebraic factorizations has a delay metric less than the delay threshold and an area less than an area of each of at least a portion of the set of possible algebraic factorizations and the area of the portion of the user design.

30. The information storage medium of claim 28, wherein the first one of the set of possible algebraic factorizations has a delay metric greater than the delay threshold and less than the delay metric of each of at least a portion of the set of possible algebraic factorizations.

31. The information storage medium of claim 28, wherein the computing a delay metric comprises:
   assigning a delay value to each of a set of nodes in the possible algebraic factorization, wherein each of the set of nodes is associated with at least one of a set of data paths in the possible algebraic factorization;
   determining a total delay for each of the set of data paths from the delay values of its associated nodes; and
   assigning the delay value of one of the set of data paths that is greater than the delay value of each of at least a portion of the set of data paths as the delay metric of the possible algebraic factorization.

32. The information storage medium of claim 31, wherein the delay value of each of the set of nodes is based on a unit delay evaluation of a data path including its associated node.

33. The information storage medium of claim 31, wherein the delay value of each of the set of nodes is based on a timing analysis of a data path including its associated node.

34. The information storage medium of claim 27, wherein the resynthesizing the user design comprises:
   determining a set of fanout-free cones in the user design;
   for each of the set of fanout-free cones, determining an associated set of possible algebraic factorizations for the first one of the set of fanout-free cones;
   computing a delay metric for each of the associated set of possible algebraic factorizations; and
   substituting one of the set of possible algebraic factorizations in place of the associated one of the set of fanout-free cones, in response to the one of the associated set of possible algebraic factorizations having a delay metric less than the delay metric of the associated one of the set of fanout-free cones or in response to the one of the associated set of possible algebraic factorizations having an area less than an area of the associated one of the set of fanout-free cones.

35. The information storage medium of claim 34, wherein computing a delay metric comprises:
   assigning a delay value to each of a set of nodes in the a possible algebraic factorization, wherein each of the set of nodes is associated with at least one of a set of data paths in the possible algebraic factorization;
   determining a total delay for each of the set of data paths from the delay values of its associated nodes; and
   assigning the delay value of one of the set of data paths that is greater than the delay value of each of at least a portion of the set of data paths as the delay metric of the possible algebraic factorization.

36. The information storage medium of claim 35, wherein the delay value of each of the set of nodes is based on a unit delay evaluation of a data path including its associated node.

37. The information storage medium of claim 35, wherein the delay value of each of the set of nodes is based on a timing analysis of a data path including its associated node.

38. The information storage medium of claim 27, wherein mapping the user design to the hardware architecture of the programmable device comprises:
   creating a first mapping from a first portion of the user design to a first set of logic resources of the programmable device, such that the first mapping is optimized to maximize speed; and
   creating a second mapping from a second portion of the user design to a second set of logic resources of the programmable device, such that the second mapping is optimized to minimize area.

39. The information storage medium of claim 38, wherein the first portion of the user design includes a set of data paths, each associated with at least one logic resource, wherein each of the set of data paths has a delay value above a delay threshold.

40. The information storage medium of claim 39, wherein the delay value of the data path is proportional to the maximum number of serially connected logic resources associated with each data path.

* * * * *

UNITED STATES PATENT AND TRADEMARK OFFICE
CERTIFICATE OF CORRECTION

PATENT NO. : 7,246,340 B1  Page 1 of 1
APPLICATION NO. : 10/849534
DATED : July 17, 2007
INVENTOR(S) : Babette Van Antwerpen et al.

It is certified that error appears in the above-identified patent and that said Letters Patent is hereby corrected as shown below:

On The Title Page:

Item (75) Inventors: Line 2, delete "Jinyon Yuan" and insert --Jinyong Yuan--

In The Claims:

Claim No. 35, Line 3, delete "the a" and insert --a--

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,246,340 B1  Page 1 of 1
APPLICATION NO. : 10/849534
DATED : July 17, 2007
INVENTOR(S) : Babette Van Antwerpen et al.

It is certified that error appears in the above-identified patent and that said Letters Patent is hereby corrected as shown below:

On The Title Page:

Item (75) Inventors: Line 2, delete "Jinyon Yuan" and insert --Jinyong Yuan--

In The Claims:

Claim No. 35, Column 16, Line 3, delete "the a" and insert --a--

This certificate supersedes the Certificate of Correction issued November 23, 2010.

Signed and Sealed this

Fourteenth Day of December, 2010

David J. Kappos
*Director of the United States Patent and Trademark Office*